US005775810A

United States Patent [19]
Shin

[11] Patent Number: 5,775,810
[45] Date of Patent: Jul. 7, 1998

[54] FERRITE DEVICE FOR SENSING TEMPERATURE

[75] Inventor: Hyeog-Soo Shin, Kyongki-do, Rep. of Korea

[73] Assignee: Samsung Electric-Mechanics Co. Ltd., Kyongki-do, Rep. of Korea

[21] Appl. No.: 690,795

[22] Filed: Aug. 1, 1996

[30] Foreign Application Priority Data

Dec. 26, 1995 [KR] Rep. of Korea ............. 1995-55976

[51] Int. Cl.⁶ ............................................. G01K 7/38
[52] U.S. Cl. ............... 374/176; 336/61; 336/212; 336/234; 252/408.1; 252/962; 252/62.51 R
[58] Field of Search ............... 374/176; 336/61, 336/212, 234; 252/962, 408.1, 62.51 R

[56] References Cited

U.S. PATENT DOCUMENTS

| | | | |
|---|---|---|---|
| 3,054,044 | 9/1962 | Shevel, Jr. | 374/176 |
| 3,663,913 | 5/1972 | Kato et al. | 336/212 |
| 3,836,827 | 9/1974 | Cuthbertson | 374/176 |
| 4,064,497 | 12/1977 | Sidor et al. | 374/176 |
| 4,537,517 | 8/1985 | Inomata et al. | 374/176 |

FOREIGN PATENT DOCUMENTS

| | | | |
|---|---|---|---|
| 0187422 | 7/1989 | Japan | 374/176 |
| 2-113137 | 9/1990 | Japan | |
| 0634119 | 11/1978 | U.S.S.R. | 374/176 |
| 1198392 | 12/1985 | U.S.S.R. | 374/176 |
| 1418580 | 8/1988 | U.S.S.R. | 374/176 |

Primary Examiner—Diego F. F. Gutierrez
Attorney, Agent, or Firm—Ladas & Parry

[57] ABSTRACT

A ferrite device for sensing temperature is disclosed, which is useful for apparatuses such as hot water vessels, fire alarms, and general electronic apparatuses. More specifically, the ferrite device for sensing temperature is manufactured by stack-printing two or more ferrite layers having different Curie temperatures (Tc). Therefore, a mass production is possible with a low manufacturing cost, and control of the process conditions is easy. The temperature sensing ferrite device includes: upper and lower layers composed of a single ferrite material; a plurality of stacked layers stacked between the upper and lower layers and consisting of two or more ferrite subregions; each of the ferrite subregions of one of the plurality of stacked layers has a composition and a shape that are the same as a ferrite subregion in another of the plurality of stacked layers screw type electrodes provided on the respective ferrite subregions.

13 Claims, 7 Drawing Sheets

FERRITE DEVICE FOR SENSING TEMPERATURE

BACKGROUND OF THE INVENTION

1. Field of the Invention

The present invention relates to a ferrite device for sensing temperature, which is useful for apparatuses such as hot water vessels, fire alarms, and general electronic apparatuses. More specifically, the present invention relates to a ferrite device for sensing temperature, which is manufactured by stack-printing two or more ferrite layers having different Curie temperatures (Tc).

2. Description of the Prior Art

The temperature sensing ferrite device is for sensing a particular temperature region, and is used in apparatuses such as hot water vessels, fire alarms, and general electronic apparatuses.

In temperature sensing ferrite devices, there are Ni-Zn ferrites, Ni-Zn-Cu ferrites, and Mn-Zn ferrites.

The temperature sensing ferrite device utilizes the Curie temperature (Tc) at which the electromagnetic properties disappear.

In accordance with the temperature, the electromagnetic properties such as permeability, inductance, magnetic flux density (Bm), coercive force (Hc) and the like become different, and the electromagnetic properties become zero at the Curie temperature.

Therefore, if a ferrite device for a particular component is to be manufactured, the kind and composition of the ferrite have to be decided on based on the variation of the electromagnetic properties versus the variation of the temperature.

As shown in FIG. 1, the conventional temperature sensing ferrite device was manufactured in the following manner. That is, a ferrite composition having a single composition is press-formed into a ring shape, and a sintering is carried out, thereby forming a ferrite core 11. Then a coil 12 is wound on the ferrite core 11, thereby completing the manufacture of the ferrite device.

However, the above described conventional ferrite device is capable of sensing only one particular temperature. Therefore, if a number of temperatures is to be sensed, the ferrite material has to have a composition ratio corresponding to the respective temperatures. Further, the ferrite core is formed by sintering, and therefore, it is difficult to achieve a compactness of the product. Further, the coil has to be wound on the ferrite core, and therefore, the manufacturing cost is increased.

Japanese Utility Model Laid-open No. Hei-2-113137 discloses an improved temperature sensing device. In this device, two or more thin layers of ferromagnetic materials having different Curie temperatures are formed on an insulated substrate. In order to measure the resistivity of the ferromagnetic thin layers, electrodes are formed on both sides of the ferromagnetic thin layers, so that a plurality of particular temperatures corresponding to the Curie temperatures can be sensed.

However, in the case of this temperature sensing device, although a plurality of temperatures can be sensed, the manufacturing cost is increased by use of the thin film forming process. Further, mass production is difficult, while the process conditions make repeatability is very fastidious. Further, the variation of the resistivity as against the variation of temperature is several $\mu\Omega$-m, and therefore, an actual measurement is difficult, with the result that its practicability is very limited.

SUMMARY OF THE INVENTION

In order to solve the above described conventional problems, the present inventor carried out study and experiments for many years, and developed the present invention as a result.

Therefore it is an object of the present invention to provide a temperature sensing ferrite device in which two or more ferrite layers having different Curie temperatures are stack-printed so as to make it possible to sense two or more temperatures, and to make the product compact, and in which the winding of a coil is not required.

It is another object of the present invention to provide a temperature sensing ferrite device in which a thick layer stacking process is adopted, so that a mass production would be possible with a low manufacturing cost, and so that the control of the process conditions would be easy.

It is still another object of the present invention to provide a temperature sensing ferrite device in which the electromagnetic properties are steeply varied at the Curie temperature in accordance with the variation of the temperature, so that the temperature measurement would be easy in actual use.

In achieving the above objects, the temperature sensing ferrite device according to the present invention includes:

upper and lower layers composed of a single ferrite material;

a plurality of stacked layers between the upper and lower layers and consisting of two or more ferrite subregions;

each of said ferrite subregions of one of the plurality of stacked layers having a composition and a shape that are the same as a ferrite subregion in another of the plurality of stacked layers; and screw type electrodes provided on the respective ferrite subregions.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENT

Figure 1:
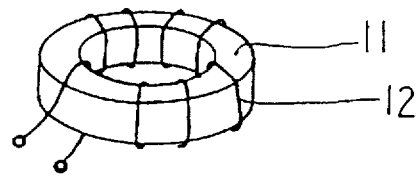
FIG. 1 is a schematic perspective view of a conventional ferrite device.

As the typical ferrite compositions which can be adopted in the present invention, there are Mn-Zn ferrites, Ni-Zn ferrites and Ni-Zn-Cu ferrites.

The compositions of the ferrite subregions should be selected by taking into account the shrinkage rate during sintering.

The reason is as follows. If the difference of the shrinkage rate between the ferrite subregions is large, then cracks may be formed on the boundaries between the subregions.

Therefore, in the present invention, it is desirable to select the compositions such that the shrinkage rate difference between the ferrite subregions at the sintering temperature is less than 1.0%.

Meanwhile, during the forming of the ferrite subregions, the shrinkage rate can be adjusted to about 3% by adding sintering agents such as $V_2O_5$ or $Bi_2O_3$, and this will be described in detail below.

In the case of the Ni-Zn-Cu ferrite, the detectable particular temperatures are decided in accordance with the content range of Ni and Zn, and therefore, the contents of Ni and Zn are properly adjusted.

However, as the content of Ni is increased, so the shrinkage rate is decreased. Therefore, in order to compensate for the lowering of the shrinkage rate, the sintering agents such as $V_2O_5$ or $Bi_2O_3$ can be added in an amount of 0.3–1.5 wt % during the formation of the subregions.

If addition of the sintering agent is less than 0.2 wt %, no efficacy can be obtained, while if its content is higher than 1.5 wt %, the increase of the shrinkage rate is saturated, and the ferrite is over-sintered. In that event, overgrowths occur in some part of the grains, and therefore, the overall grain distribution becomes non-uniform, thereby deteriorating the electromagnetic properties.

In the case of the Mn-Zn ferrites, sintering agents such as $V_2O_5$ or $Bi_2O_3$ can be added in an amount of 0.02–0.5 wt % during the formation of the ferrite subregions.

If addition of the sintering agent is less than 0.02%, no efficacy can be obtained. On the other hand, if addition is more than 0.5 wt %, the shrinkage rate is saturated like in the Ni-Zn-Cu ferrites, and the electromagnetic properties are deteriorated.

In the case of the Ni-Zn ferrites, sintering agents such as $V_2O_5$ or $Bi_2O_3$ can be added in an amount of 0.02–0.5 wt % during the formation of the ferrite subregions.

If addition of the sintering agent is less than 0.03%, no efficacy can be obtained. On the other hand, if addition is more than 0.5 wt %, the increase of the shrinkage rate is saturated, and the electromagnetic properties are deteriorated.

In a preferable form, the Mn-Zn ferrite composition includes: 5–45 mole % of $Mn_3O_4$, 5–45 mole % of ZnO, and 49–51 mole % of $Fe_2O_3$. The Ni-Zn ferrite composition includes: 5–45 mole % of NiO, 5–45 mole % of ZnO, and 49–51 mole % of $Fe_2O_3$. The Ni-Zn-Cu ferrite composition includes: 5–37 mole % of NiO, 5–38 mole % of ZnO, 8–14 mole % of CuO, and 49–51 mole % of $Fe_2O_3$.

The sintering temperatures and usable internal conductor materials for the above ferrite compositions are shown in the table below.

| Ferrite composition | Sintering temp. | Internal conductor material |
| --- | --- | --- |
| Mn-Zn ferrite | 1200–1300° C. | Ag-Pd, Pd, Pt,Ni |
| Ni-Zn ferrite | 1000–1150° C. | Ag-Pd, Ni |
| Ni-Cu-Zn ferrite | 870 940° C. | Ag |

Now the manufacturing process for the ferrite device according to the present invention will be described.

First, the powder of the ferrite composition is adjusted so that the composition would have the relevant Curie temperature. Then the powder is mixed, and calcined. Then preferably the powder is crushed to a particle size of 0.4–0.8 μm so as to prepare a ferrite paste. Then a screen printing method is carried out to form the upper and lower layers and the stacked layers. This will be described in detail referring to FIG. 2 wherein sequential steps in a method of manufacturing a temperature sensing device of the invention are depicted by sequential Roman numerals I–XXI.

Figure 2:
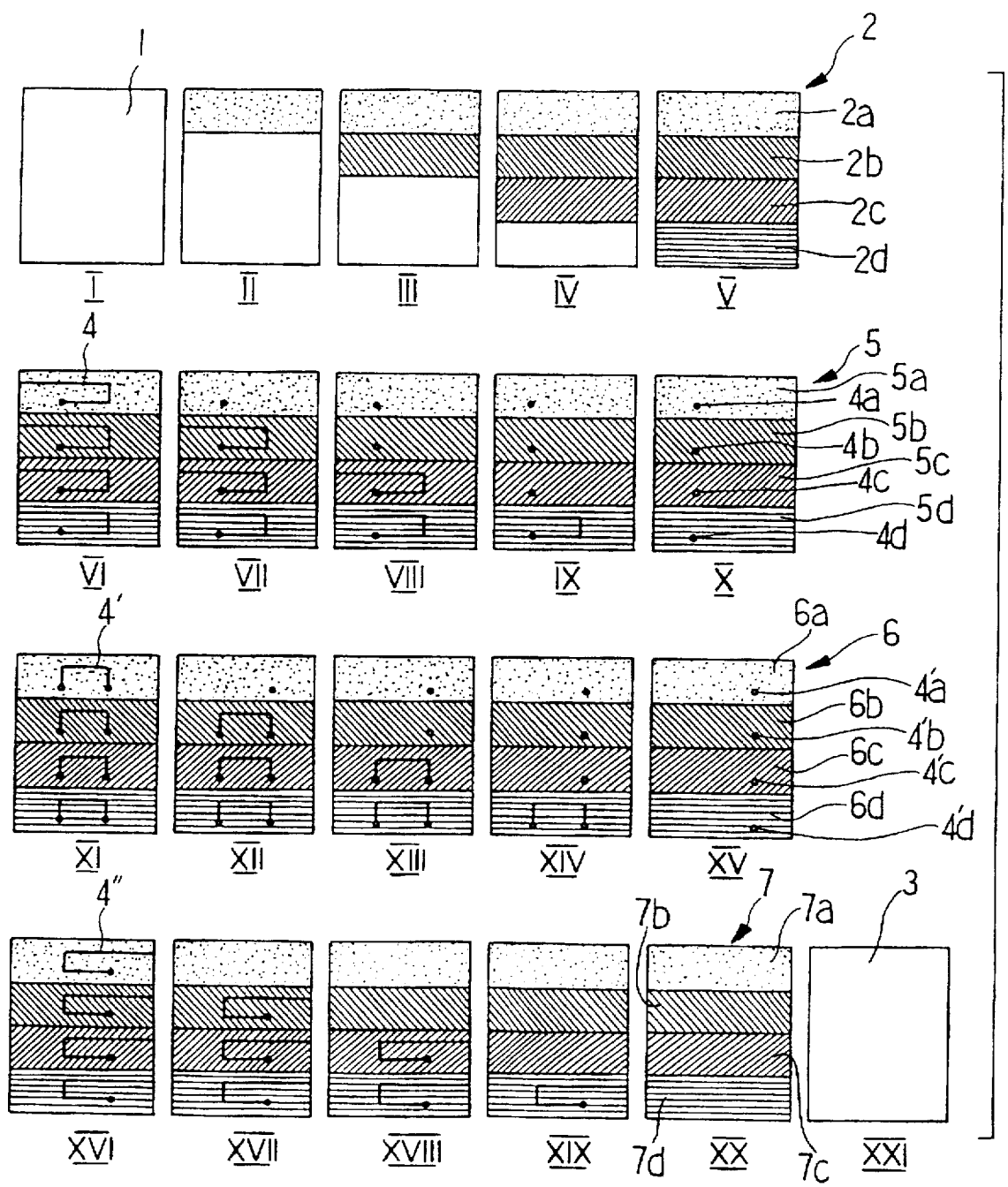
FIG. 2 is a schematic view showing sequential steps of a manufacturing process for the temperature sensing ferrite device according to the present invention.

That is, as shown in FIG. 2 at reference numeral I, a screen printing is carried out by using a ferrite paste having a certain composition so as to form a lower layer 1. Then by using other pastes having different Curie temperatures, a screen printing is carried out sequentially (reference numerals II–V) to form two or more ferrite subregions 2a–2d having different Curie temperatures, the subregions 2a–2d constituting a stacked layer 2 (see refernce number V).

Then as shown in FIG. 2 at reference number IV, screen printings are carried out upon the respective subregions 2a–2d so as to form an electrode 4. Then additional ferrite subregions 5a–5d are superposed on subregions 2a–2d respectively by sequential screen printings, which cover electrode 4 except that, the respective subregions are provided with electrode accommodating holes 4a–4d. Additional ferrite subregions 5a–5d constitute a stacked layer 5 (reference number X)

Then as shown in FIG. 2 at reference number XI an electrode 4' is formed so as for the electrode 4' to be electrically connected to the ferrite subregions lying below. Then addtionally ferrite subregions 6a–6d are superposed on subregions 5a–5d respectively so as to cover electrode 4' except the respective ferrite subregions are provided with electrode accommodating holes 4'a–4'd. Additional ferrite subregions 6a–6d constitute a stacked layer 6 (reference numeral XV).

Then as shown in FIG. 2D 2 at reference numeral XVI, an electrode 4" is formed in such a manner that the electrode 4" is electrically connected to the ferrite subregions lying below. Then additional ferrite subregions are superposed on subregions 6a–6d respectively so as to cover electrode 4". Additional ferrite subregions 7a–7d constitute a stacked layer 7 (reference numeral XV). Then, an upper layer 3 is formed.

The electrodes have the shape of a screw, and the materials of the electrodes are Ag, Pd, Ni, or Ag-Pd.

In FIG. 2, there are four layers of stacked layers 4, 5, 6 and 7, but the present invention is not limited to this form. More layers can be provided depending on the application.

Then a sintering is carried out at a proper temperature, then Ag or the like is used as an external electrode, and then, a further heating is carried out.

Now the present invention will be described based on actual examples.

<Example 1>

Figure 3:
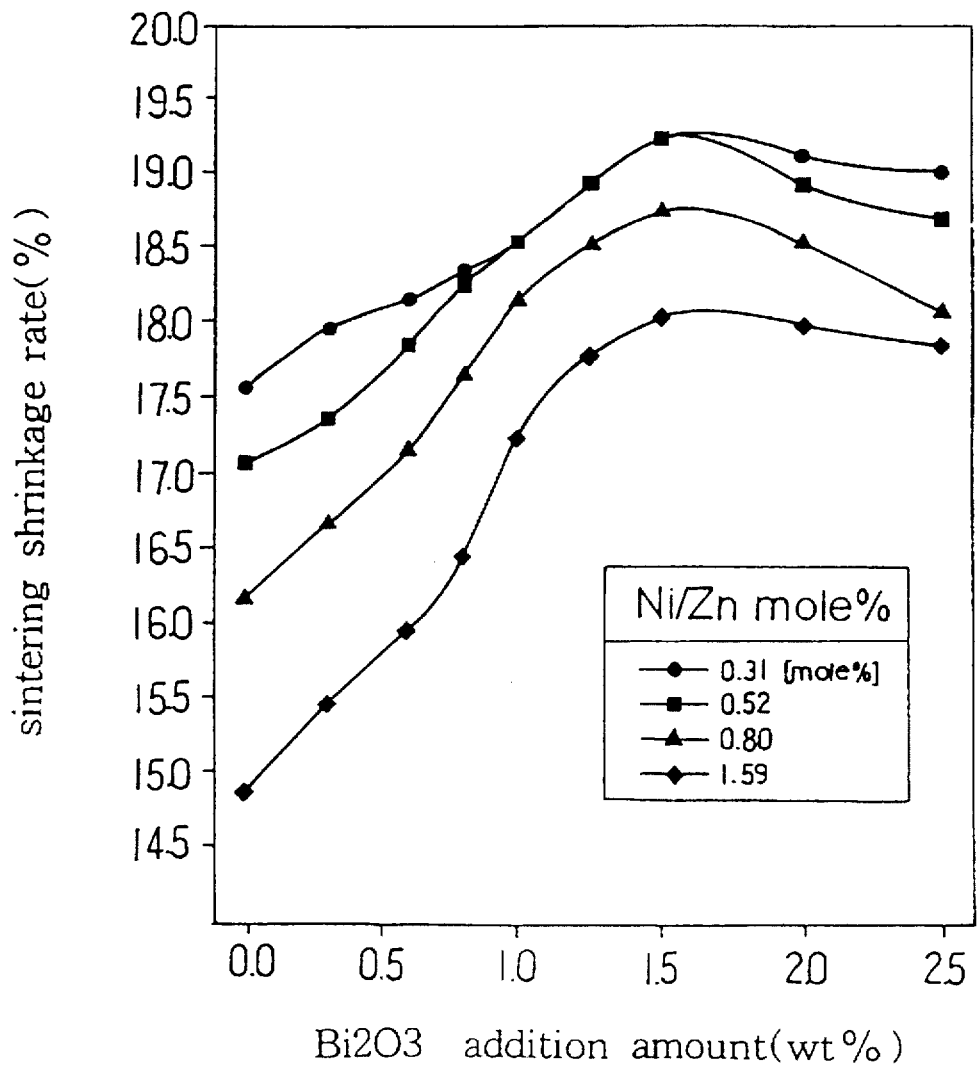
FIG. 3 is a graphical illustration showing the variation of shrinkage rate versus the variation of amount of $Bi_2O_3$ for various Ni/Zn mole ratios in a Ni-Cu-Zn ferrite.

The variation of shrinkage rate versus the variation of amount of $Bi_2O_3$ for various Ni/Zn mole ratios in a Ni-Cu-Zn ferrite was checked, and the results were illustrated in FIG. 3.

Figure 4:
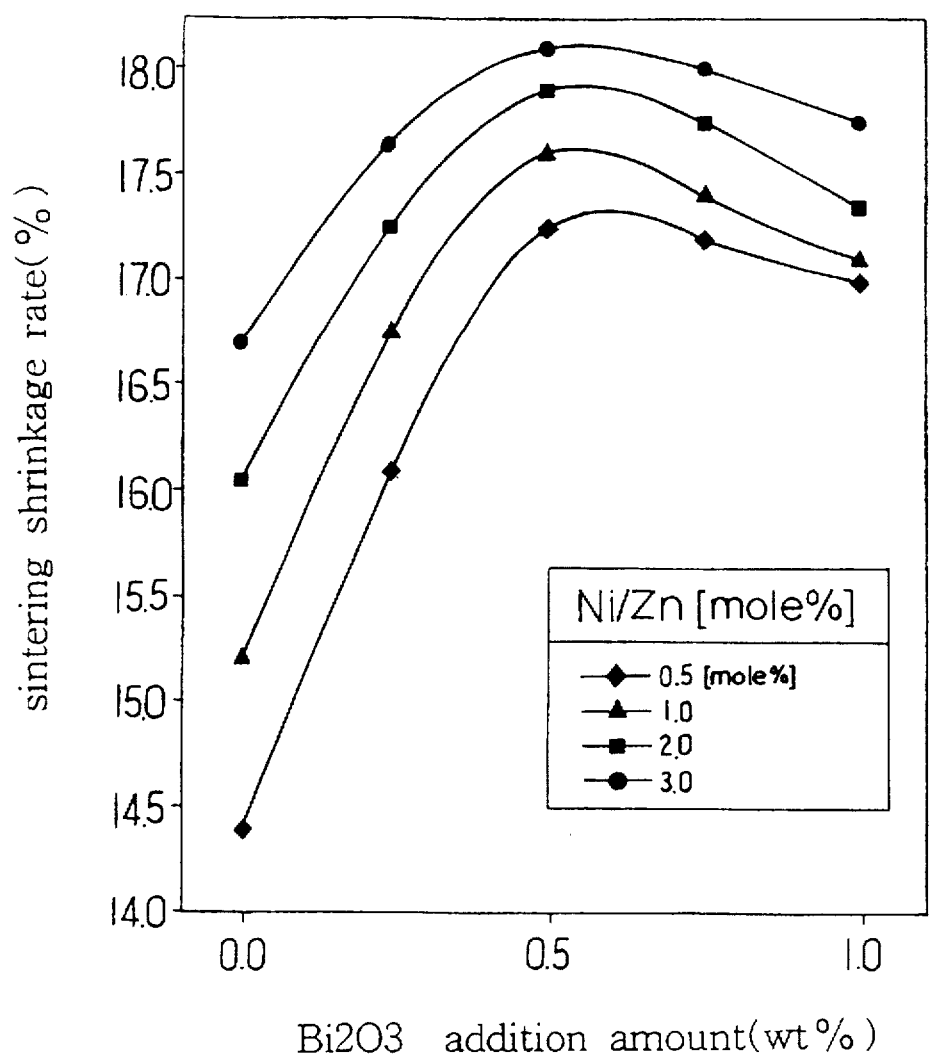
FIG. 4 is a graphical illustration showing the variation of shrinkage rate versus the variation of amount of $Bi_2O_3$ for various Ni/Zn mole ratios in a Ni-Zn ferrite.

The variation of shrinkage rate versus the variation of amount of $Bi_2O_3$ for various Ni/Zn mole ratios in a Ni-Zn ferrite was checked, and the results were illustrated in FIG. 4.

Figure 5:
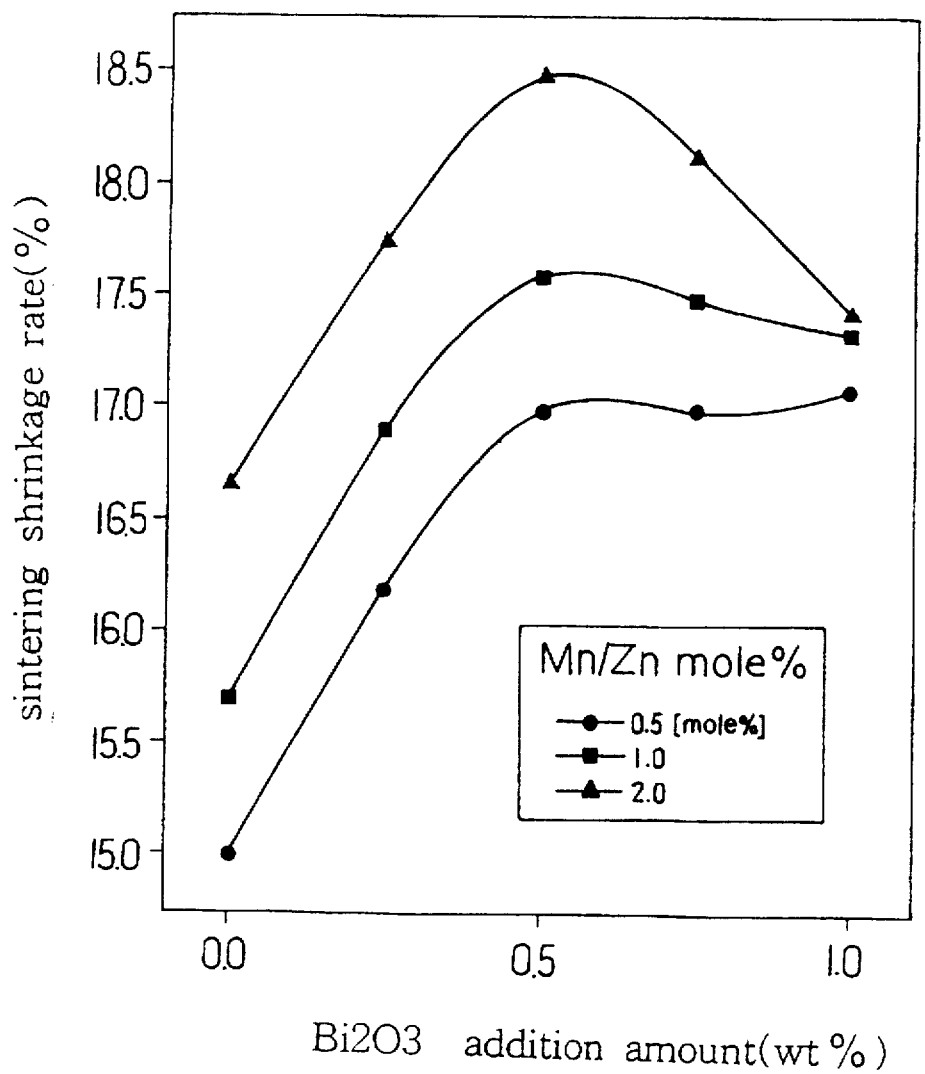
FIG. 5 is a graphical illustration showing the variation of shrinkage rate versus the variation of amount of $Bi_2O_3$ for various Mn/Zn mole ratios in a Mn-Zn ferrite.

The variation of shrinkage rate versus the variation of amount of $Bi_2O_3$ for various Mn/Zn mole ratios in a Mn-Zn ferrite was checked, and the results were illustrated in FIG. 5.

As shown in FIG. 3, in the Ni-Cu-Zn ferrites, if the addition of $Bi_2O_3$ is more than 1.5 wt %, it is seen that the shrinkage rate increase is saturated, and that the maximum shrinkage rate increase is at most 3%.

As shown in FIG. 4, in the Ni-Zn ferrites, if the addition of $Bi_2O_3$ is more than 0.5 wt %, it is seen that the shrinkage rate increase is saturated, and that the maximum shrinkage rate increase is at most 2.7%.

As shown in FIG. 5, in the Mn-Zn ferrites, if the addition of $Bi_2O_3$ is more than 0.5 wt %, it is seen that the shrinkage rate increase is saturated, and that the maximum shrinkage rate increase is at most 2.0%.

In the ferrite compositions having the same curie temperature, it is seen that the shrinkage rate can be varied up to the maximum 3.0%.

<Example 2>

Figure 6:
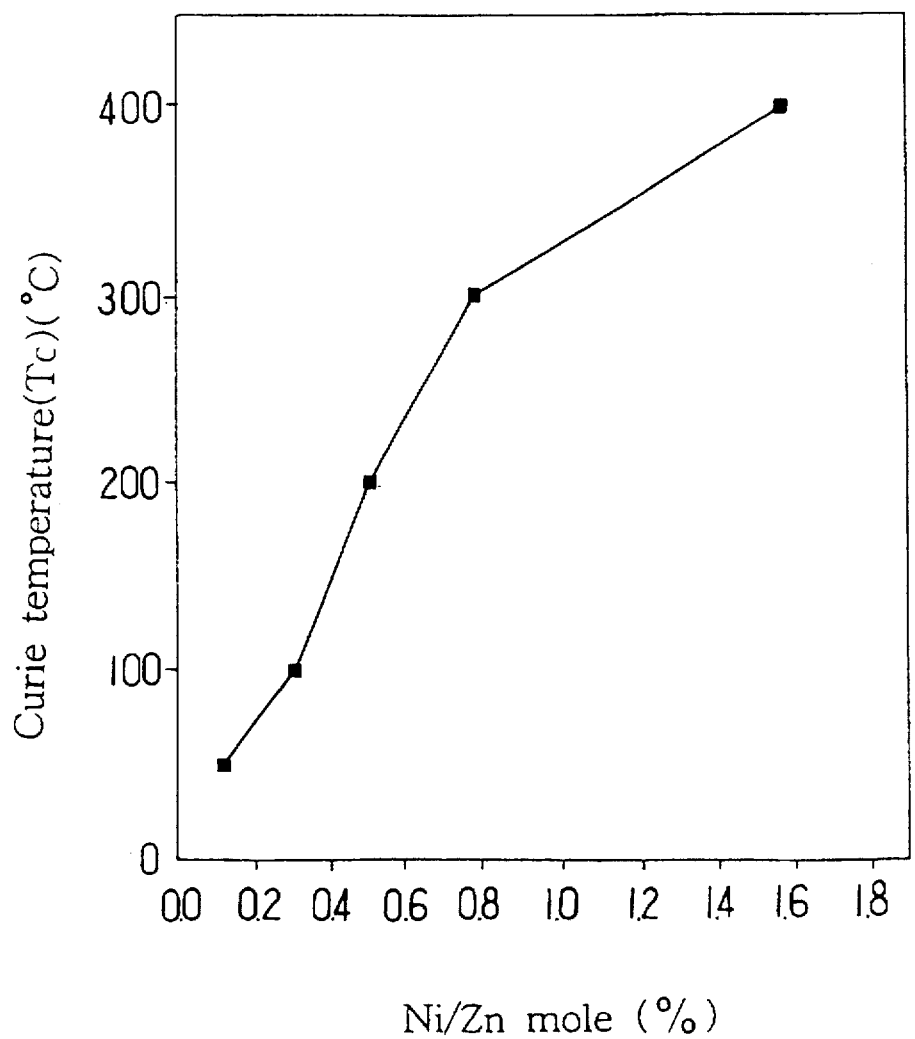
FIG. 6 is a graphical illustration showing the variation of the curie temperature (Tc) versus the variation of Ni/Zn mole ratio in Ni-Cu-Zn ferrite.

On the Ni-Zn-Cu ferrites which were composed of as shown in Table 1 below, the sintering shrinkage rates at 920° C. were measured, and the measured results are shown in Table 1 below. Meanwhile, the variation of the Curie temperature Tc versus the variation of Ni/Zn mole % as shown in Table 1 is illustrated in FIG. 6.

TABLE 1

| Test piece No. | A | B | C | D | E |
| --- | --- | --- | --- | --- | --- |
| Ni/Zn mole % | 0.12 | 0.31 | 0.52 | 0.8 | 1.59 |
| Tc (Curie temperature) | 50 | 100 | 200 | 300 | 400 |
| Sintering shrinkage rate (5) | 18.1 | 17.6 | 17.1 | 16.2 | 14.9 |

*In the above table, there are contained: 49.8 mole % of $Fe_2O_3$; and 10 mole % of CuO.

As shown in Table 1 above, the range of the sintering shrinkage rate is 18.1–14.9%. Further, as shown in Table 1 above and in FIG. 6, the Curie temperature range for the ferrite is 50°–400° C.

Meanwhile, $Bi_2O_3$ was added to the ferrite composition of Table 1, and then, the sintering shrinkage rate at 920° C. was measured. The measured results are shown in Table 2 below.

TABLE 2

| Test Sample No. | A | B1 | C1 | D1 | E1 |
| --- | --- | --- | --- | --- | --- |
| Ni/Zn mole % | 0.12 | 0.31 | 0.52 | 0.8 | 1.59 |
| Tc | 50 | 100 | 200 | 300 | 400 |
| $Bi_2O_3$ addition (w/o) | 0.0 | 0.3 | 0.6 | 1.0 | 1.5 |
| Crushed particle size (μm) | 0.65 | 0.62 | 0.59 | 0.55 | 0.50 |
| Sintering shrinkage rate (5) | 18.1 | 18.0 | 17.9 | 18.2 | 18.1 |

The temperature sensing ferrite device of the present invention which was composed of as shown in Table 2 above was inspected. Then it is was found that a temperature sensing ferrite having no cracks was realized. By using this temperature sensing ferrite device, the variation of inductance L (μH) was measured, and the measured results are shown in FIG. 7.

Figure 7:
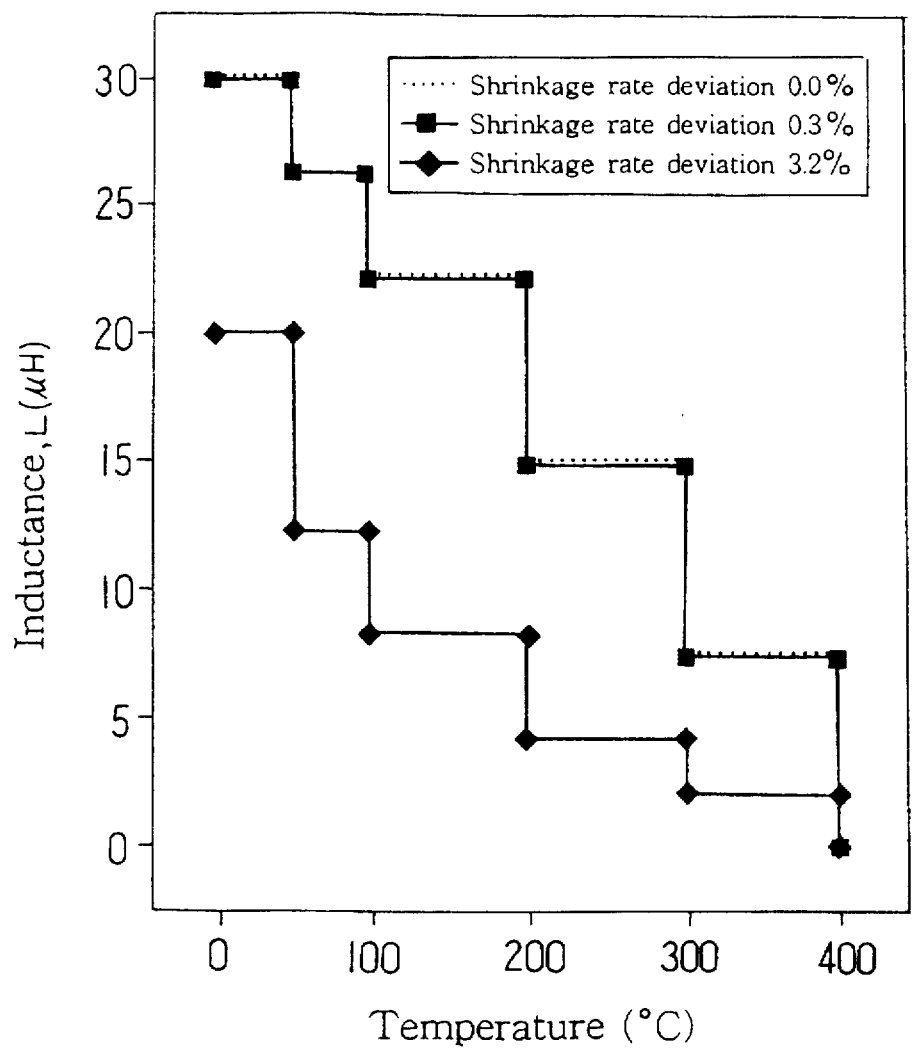
FIG. 7 is a graphical illustration showing the variations of the temperature and inductance versus the shrinkage rate deviation.

FIG. 7 shows the values for the ferrite device which was manufactured by using the composition of Table 1 (Shrinkage rate deviation:3.2%), and for the ferrite devices which was manufactured by using a composition having 0% shrinkage rate.

Figure 8:
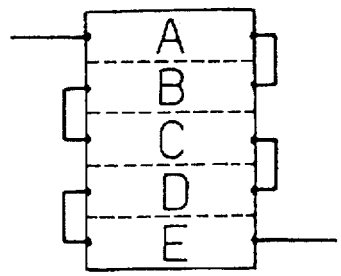
FIG. 8 illustrates a circuit including subregions A–E for measuring the variations of inductance versus the variation of temperature.

In measuring the inductance, the circuit of FIG. 8 was used, and the measuring frequency was 10 KHz (at 0.01 V).

As shown in FIG. 7, in the case where the ferrite device was manufactured by using a ferrite composition having a shrinkage rate of 0.3% which corresponds to the range of the present invention, a plurality of temperatures could be measured with a superior sensitivity.

<Example 3>

$V_2O_5$ was added to the Ni-Zn-Cu ferrite composition which was composed as shown in Table 1 of Example 2, and then, the sintering shrinkage rate at 920° C. was measured. The measured results are shows in Table 3 below.

TABLE 3

| Sample name | A2 | B2 | C2 | D2 | E2 |
| --- | --- | --- | --- | --- | --- |
| Ni/Zn mole % | 0.12 | 0.31 | 0.52 | 0.80 | 1.59 |
| Tc (°C.) | 50 | 100 | 200 | 300 | 400 |
| $V_2O_5$ addition (wt %) | 0.22 | 0.35 | 0.5 | 0.75 | 1.20 |
| Crushed particle size (μm) | 0.65 | 0.62 | 0.59 | 0.55 | 0.50 |
| Sintering shrinkage rate | 19.0 | 19.0 | 19.0 | 19.0 | 19.0 |

As shown in Table 3 above, the sintering shrinkage rates are 19.0% for all the samples.

The temperature sensing ferrite devices which were manufactured by using the compositions of Table 3 were inspected, and found that the temperature sensing ferrite devices having no cracks were realized.

Figure 9:
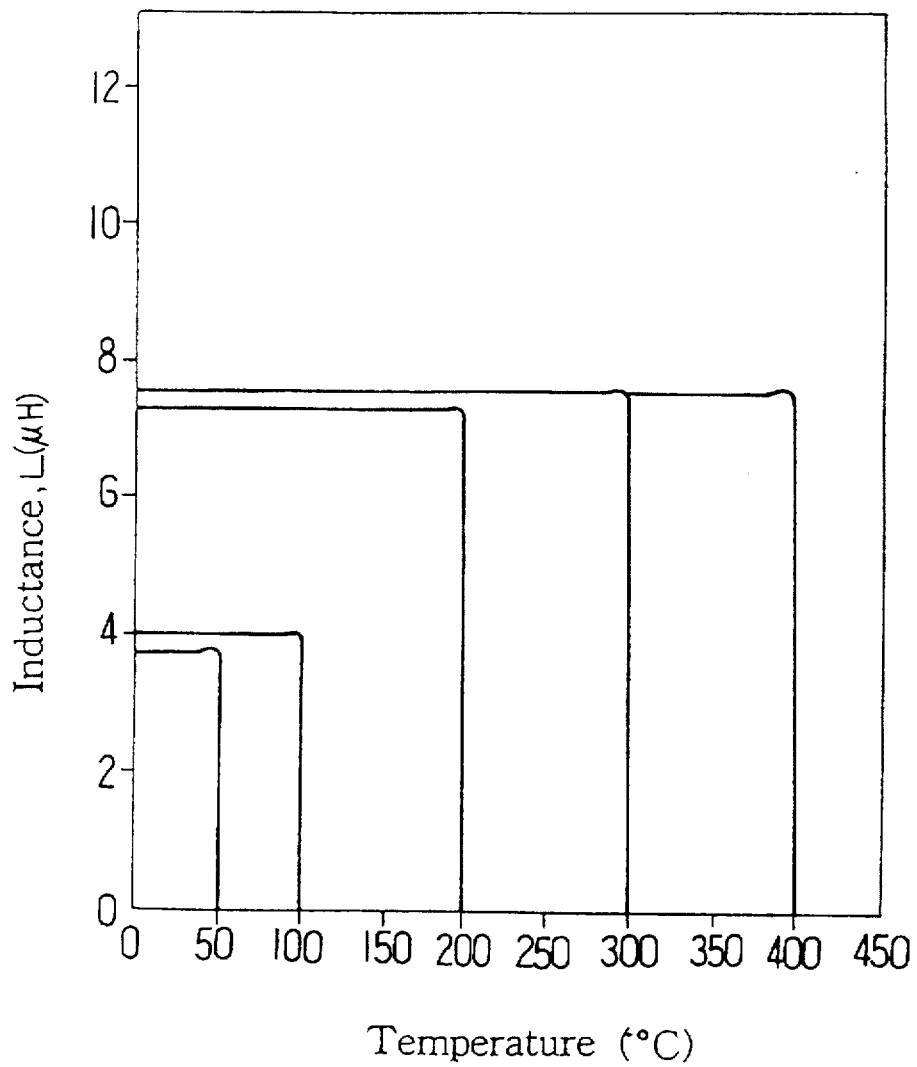
FIG. 9 is a graphical illustration showing the variation of inductance versus the variation of temperature for subregions of ferrite device of the present invention.

Further, on subregions of the ferrite device which were manufactured by using the compositions of Table 3, the variation of inductance values versus the variation of temperature was measured, and the measured results are shown in FIG. 9.

Here, the measuring frequency was 10 KHz (at 0.01 V).

As shown in FIG. 9, the inductance value is zero at the temperatures corresponding to the curie temperature, and therefore, it can be seen that the temperature variation regions can be sensed.

According to the present invention as described above, the temperature sensing ferrite device is manufactured by stack-printing two or more ferrite layers, and therefore, two or more temperatures can be sensed. Further, a product compactness can be achieved. Further, the internal conductor is wound within the ferrite layers, and therefore, mass production is possible.

What is claimed is:

1. A temperature sensing ferrite device comprising:
   (a) a lower layer and an upper layer each comprising a ferrite material;
   (b) a first stacked layer between the lower layer and the upper layer and comprising a plurality of first layer subregions, each of said first layer subregions comprising a ferrite material and bordering upon another of the first layer subregions, each of said first layer subregions having a composition and a Curie temperature that is different than a composition and a Curie temperature of a first layer subregion upon which it borders;
   (c) a second stacked layer on the first stacked layer and comprising a plurality of second layer subregions, each of the second layer subregions having the shape of, and being superposed on, one of the plurality of first layer subregions, each of the second layer subregions having a composition and Curie temperature that is the same as the composition and Curie temperature of the first layer subregion on which it is superposed; and (d) electrode means for electrically connecting each of the second layer subregions to the first layer subregion on which it is superposed.

2. The temperature sensing device as claimed in claim 1, wherein the electrode means comprises a plurality of screw type electrodes, each of the superposed first layer and second layer subregions being provided with one of the plurality of screw type electrodes.

3. The temperature sensing device as claimed in claim 2, wherein the upper layer and the lower layer each has a single composition.

4. The temperature sensing device as claimed in claim 3, wherein each of the plurality of first layer and second layer subregions borders upon another of the respective first layer and second layer subregions substantially without cracks therebetween.

5. The temperature sensing device as claimed in claim 1, wherein the device is formed by a process comprising sintering each of the first layer and second layer subregions at a sintering temperature, the respective compositions of said first layer and second layer subregions being such that first and second layer subregions that border each other shrink at respective rates that differ by less than 1.0% at said sintering temperature.

6. The temperature sensing device as claimed in claim 5, wherein the composition of each of the first layer and second layer subregions comprise 0.02–0.5 weight percent of $Bi_2O_3$ or $V_2O_5$.

7. The temperature sensing device as claimed in claim 1, wherein each of said upper and lower layers comprises a Ni-Cu-Zn ferrite composition; and each of the first layer and second layer subregions comprises a Ni-Cu-Zn ferrite composition with 0.2–1.5 weight percent of $Bi_2O_3$ or $V_2O_5$.

8. The temperature sensing device as claimed in claim 7, wherein each of said upper and lower layers consists essentially of said Ni-Cu-Zn ferrite composition.

9. The temperature sensing device as claimed in claim 1, wherein each of said upper and lower layers comprises a Ni-Zn ferrite composition; and each of the first layer and second layer subregions comprises a Ni-Zn ferrite composition with 0.02–0.5 weight percent of $Bi_2O_3$ or $V_2O_5$.

10. The temperature sensing device as claimed in claim 9, wherein each of said upper and lower layers consists essentially of said Ni-Zn ferrite composition.

11. The temperature sensing device as claimed in claim 1, wherein each of said upper and lower layers comprises a Mn-Zn ferrite composition; and each of the first layer and second layer subregions comprises a Mn-Zn ferrite composition with 0.02–0.5 weight percent of $Bi_2O_3$ or $V_2O_5$.

12. The temperature sensing device as claimed in claim 11, wherein each of said upper and lower layers consists essentially of said Mn-Zn ferrite composition.

13. The temperature sensing device as claimed in claim 1, comprising at least one additional stacked layer between the lower layer and the upper layer, said at least one additional stacked layer comprising a plurality of additional layer subregions, each of the additional layer subregions being superposed on one of the plurality of second layer subregions and having a shape, composition and Curie temperature that is the same as the shape, composition and Curie temperature of the second layer subregion on which it is superposed; said electrode means electrically connecting each of the additional layer subregions to the second layer subregion on which it is superposed.

* * * * *